United States Patent
Nussbaum (10) Patent No.: US 9,224,531 B2
(45) Date of Patent: Dec. 29, 2015

(54) POWER CONVERTER USING ORTHOGONAL SECONDARY WINDINGS

(75) Inventor: Michael Nussbaum, Newton, MA (US)

(73) Assignee: BOSE CORPORATION, Framingham, MA (US)

(*) Notice: Subject to any disclaimer, the term of this patent is extended or adjusted under 35 U.S.C. 154(b) by 1244 days.

(21) Appl. No.: 13/076,923

(22) Filed: Mar. 31, 2011

(65) Prior Publication Data

US 2012/0249105 A1 Oct. 4, 2012

(51) Int. Cl.
*G05F 1/00* (2006.01)
*H01F 27/28* (2006.01)
*H02M 3/158* (2006.01)
*H02M 3/335* (2006.01)
*H02M 1/00* (2007.01)

(52) U.S. Cl.
CPC ......... *H01F 27/2804* (2013.01); *H02M 3/1584* (2013.01); *H01F 2027/2819* (2013.01); *H02M 3/33523* (2013.01); *H02M 2001/0032* (2013.01); *H02M 2001/0064* (2013.01); *H02M 2003/1586* (2013.01); *Y02B 70/16* (2013.01)

(58) Field of Classification Search
CPC .......... H02M 3/1584; H02M 3/33523; H02M 2001/0032
USPC ......... 323/213, 222, 232, 247, 250, 262, 172, 323/282, 301, 332, 334; 336/200, 214, 221, 336/232, 233
See application file for complete search history.

(56) References Cited

U.S. PATENT DOCUMENTS

| | | | |
|---|---|---|---|
| 5,684,678 A | 11/1997 | Barrett | |
| 6,087,921 A * | 7/2000 | Morrison | 336/200 |
| 6,642,672 B2 * | 11/2003 | Hu et al. | 315/276 |
| 6,930,893 B2 * | 8/2005 | Vinciarelli | 363/17 |
| 8,502,520 B2 * | 8/2013 | Chandrasekaran | 323/362 |
| 2009/0009729 A1 | 1/2009 | Sakai | |

FOREIGN PATENT DOCUMENTS

| | | |
|---|---|---|
| CN | 1391334 A | 1/2003 |
| CN | 1439461 A | 9/2003 |
| EP | 0246377 | 5/1987 |
| EP | 0778659 | 6/1997 |
| GB | 1416403 | 12/1975 |
| SU | 1112505 A2 | 9/1984 |

OTHER PUBLICATIONS

Jitaru, Ionel Dan. "Signal Transfer Through Power Magnetics." 2002 Power Technology Symposium. IBM Power Technology and Qualifications. , Bloomington, Minnesota. (Sep. 2002). 6 pgs.
International Search Report and Written Opinion dated Mar. 28, 2013 for PCT/US2010/029651.

* cited by examiner

*Primary Examiner* — Adolf Berhane
*Assistant Examiner* — Afework Demisse (57) ABSTRACT

A power conversion device includes a magnetic core; and a plurality of windings surrounding portions of the magnetic core, including a first set of windings defining a first magnetic flux path, a second set of windings defining a second magnetic flux path magnetically orthogonal to the first magnetic flux path, and a third set of windings. Each winding of the third set of windings is configured to be excitable via both the first flux path and the second flux path.

17 Claims, 8 Drawing Sheets

POWER CONVERTER USING ORTHOGONAL SECONDARY WINDINGS

CROSS-REFERENCE TO RELATED APPLICATIONS

This application claims priority to U.S. application Ser. No. 13/076,923, filed on Mar. 31, 2011, titled "POWER CONVERTER USING SOFT COMPOSITE MAGNETIC STRUCTURE" and filed concurrently with the present application, which is incorporated herein by reference.

BACKGROUND

Figure 1A:
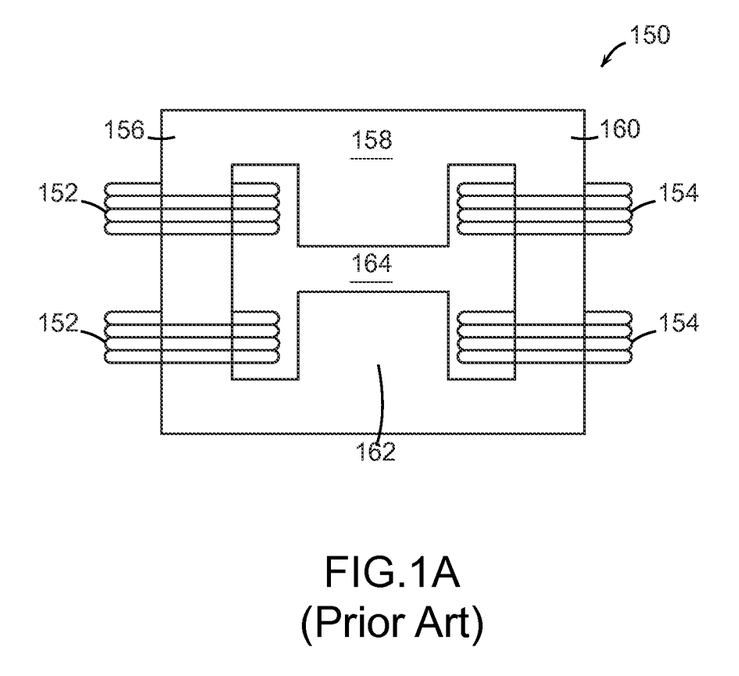
FIG. 1A is a side cross-sectional view of a boost converter.

Some power conversion systems, for example, dual interleaved boost power factor converter (PFC) systems, make use of magnetically coupled inductors or coils wound around a magnetic core. For instance, referring to FIG. 1A, a magnetic core 150 of a boost converter includes a first set of inductor coils 152 and a second set of inductor coils 154. Inductor coils 152 are disposed around a first leg 156 of a core 158, and inductor coils 154 are disposed around a second leg 160 of the core. Energy storage in boost converter 150 is localized in a center leg 162 including a gap 164. The magnetic (H) field in gap 164 is oriented perpendicular to the wide axis of inductor coils 152 and 154. Boost converters including magnetic core 150 are generally suitable for a power throughput of about a few hundred Watts. However, attempts to scale up such boost converters may face efficiency limitations in some systems, for instance due to geometry constraints and/or eddy current losses when the power rating is increased beyond the 1 kW range. In some examples, the power conversion systems are used in professional sound systems.

Some power conversion systems make use of one primary winding and multiple secondary windings, with one of the secondary windings being used to provide "housekeeping" power to control circuitry, such that a separate power conversion component is not needed to power the control circuitry. In situations in which the control circuitry requires power during standby periods, the production of housekeeping power may be inefficient, for example, due to losses in the switching components of the system driven by the primary windings. This inefficiency negates some of the advantages of sharing the primary windings for multiple sets of secondary windings during normal operation.

Figure 1B:
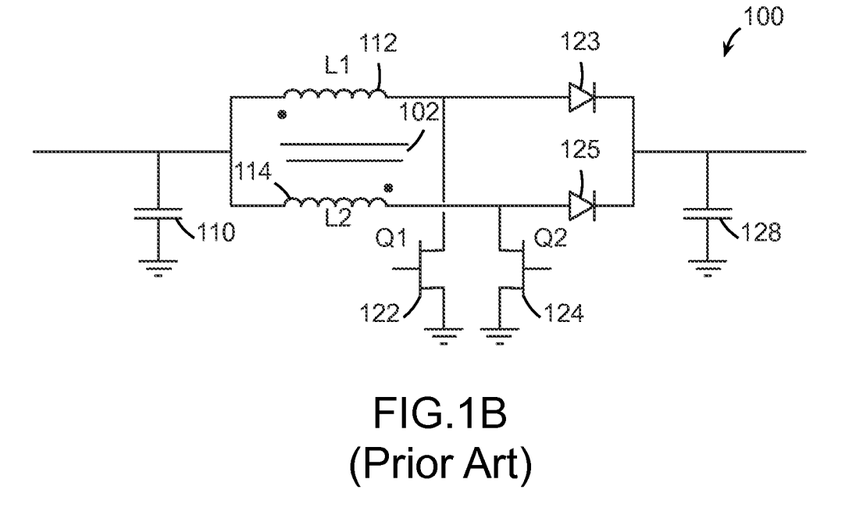
FIG. 1B is a circuit diagram of a dual interleaved boost circuit.

Referring to FIG. 1B, an example of a dual interleaved boost converter circuit 100 includes inductors L1 112 and L2 114, which are magnetically coupled across a common core 102. The degree of coupling between the inductors is controlled by the width of the gap separating the windings of the two inductors. The maximum flux ripple in the core of the dual interleaved boost converter circuit 100 is roughly half that of a single boost circuit, and the AC ripple on the dual interleaved boost circuit is also reduced. Two switches Q1 122 and Q2 124 (e.g., metal-oxide-semiconductor field effect transistors (MOSFETs)) are duty cycle controlled and typically run 180° out of phase, although in some cases 90° operation may be preferable. A circuit having sufficiently coupled inductors exhibits little to no ripple current.

SUMMARY

In a general aspect, a power conversion device includes a magnetic core; and a plurality of windings surrounding portions of the magnetic core, including a first set of windings defining a first magnetic flux path, a second set of windings defining a second magnetic flux path magnetically orthogonal to the first magnetic flux path, and a third set of windings. Each winding of the third set of windings is configured to be excitable via both the first flux path and the second flux path.

Embodiments may include one or more of the following.

The device is operable in a plurality of modes, including a first mode in which power is transferred from one or more windings of the first set of windings to the windings of the third set of windings, and in a second mode in which power is transferred from windings of the second set of windings to the windings of the third set of windings.

The device further includes circuitry to form a first power supply using the first set of windings operable only in the first mode, and circuitry to form a second power supply for providing power via the third set of windings operable in both the first mode and the second mode.

The first mode comprises a primary operating mode and the second mode comprises a standby operating mode. The first power supply has a power capacity as least ten times greater than the second power supply. The first power supply has a power capacity of at least 0.2 kW.

The first power supply comprises a boost converter. The first set of winding comprises a plurality of windings coupled by the magnetic core, and wherein the boost converter comprises an interleaved boost converter.

The circuitry further comprises a rectifier coupled to each of the winding of the third set of windings. The circuitry further comprises a charge pump coupled to each of the winding of the third set of windings.

The second set of windings comprises a plurality of windings arranged in a serial connection, and the third set of windings comprises a plurality of windings. Wach winding of the third set of windings corresponds to a different one of the windings of the second set of windings.

Each of the windings of the first set of magnetic windings is coupled to a MOSFET having a first current rating, and wherein each winding of the second set of windings is coupled to a MOSFET having a second current rating less than the first current rating.

Each winding of the first set of winding is disposed on a substrate of a set of one or more substrates, the magnetic core passing through openings in the substrates.

In another general aspect, a method for power conversion includes, in a first operating mode, exciting windings of a first set of windings surrounding portions of a magnetic core causing a first power output. The exciting of the first set of windings causing a second power output via a third set of windings magnetically coupled to the first set of windings via the magnetic core. The method further includes, in a second operating mode, exciting winding of a second set of windings surrounding portions of the magnetic core, a second magnetic flux path formed by the second set of windings being magnetically orthogonal to a first magnetic flux path formed by the first set of windings. The exciting of the second set of windings causing a power output via the third set of windings magnetically coupled to the second set of windings via the magnetic core.

Embodiments may include one or more of the following.

The first operating mode comprises a primary operating mode and the second operating mode comprises a standby operating mode.

The first set of windings form part of a first power supply and the second set of windings form part of a second power supply. The first power supply has a power capacity at least ten times greater than the second power supply.

In a general aspect, a power conversion device includes a magnetic core; and a plurality of windings surrounding portions of the magnetic core, including a first winding and a second winding magnetically coupled through the magnetic core. The magnetic core comprises a first part formed of a first material and a second part formed of a second material, the first material having a first stiffness and the second material having a second stiffness substantially less than the first stiffness. The first winding and the second winding are magnetically coupled through the first part of the magnetic core.

Embodiments may include one or more of the following.

The first material has a first magnetic permeability and the second magnetic material has a second magnetic permeability less than the first magnetic permeability.

The first material comprises ferrite.

The second material comprises a composite. The second material includes a polymer. The second material includes at least one of iron powder, ferrite powder, Sendust, Metglass powder, or an amorphous soft magnetic alloy.

The second stiffness is about 1000 times less than the first stiffness. The second stiffness is less than about 100 MPa.

The first winding is disposed on a first substrate and the second winding is disposed on a second substrate, the magnetic core passing through openings in the first substrate and the second substrate.

The first part of the magnetic core comprises a first element and a second element. The first element includes a plurality of first legs, each first leg configured to fit through a corresponding opening in the first substrate. The second element includes a plurality of second legs, each second leg configured to fit through a corresponding opening in the second substrate. The first legs and the second legs mate to form the first part of the magnetic core.

The first substrate is a first circuit board and the second substrate is a second circuit board.

The second part of the magnetic core comprises a third element, the third element coupled in contact with the first part of the magnetic core. At least a portion of the third element is disposed between the first winding and the second winding.

The second part of the magnetic core forms an annular structure.

The device further includes circuitry coupled to the windings forming a power converter. The first winding and the second winding form coupled inductors. The power converter comprises a dual interleaved boost converter. During operation of the boost converter, the first winding and the second winding form coupled inductors and during operation cyclical energy storage in the magnetic core is substantially concentrated in the second part of the magnetic core.

In another general aspect, a method for assembling a power conversion device includes assembling a magnetic core having a first part formed of a first material and a second part formed of a second material, the first material having a first stiffness and the second material having a second stiffness substantially less than the first stiffness. Assembling the magnetic core includes disposing a first element of the first part of the core within a first winding; and forming the second part of the core to maintain contact with the first part of the core such that the second part of the core forming at least part of magnetic flux paths induced by current in the first winding.

Embodiments may include one or more of the following.

The first material has a first magnetic permeability and the second material has a second magnetic permeability less than the first magnetic permeability.

The method further includes disposing a second element of the first part of the core within a second winding. The second part of the core providing magnetic coupling between the first winding and the second winding. The method further includes mating the first element and the second element of the first part of the core; and forming the second part to maintain contact with the first part after mating the first and the second elements.

The first winding is formed on a first substrate, and wherein disposing the first element of the first part of the core within a first winding includes passing the first element through one or more openings in the first substrate.

The second part comprises a mechanically soft material, and forming the second part to maintain contact with the first part includes deforming the second part.

Forming the second part to maintain contact with the first part includes positioning a precursor of the second material in a region defined at least in part by the first part of the core; and causing a transformation of the precursor material to form the second material. Causing the transformation comprises curing the precursor material. The precursor material comprises a liquid material, and wherein position the precursor comprises pouring the precursor into the region.

Among other advantages, the systems and methods described herein provide a scalable geometry that allows a dual interleaved boost converter to operate at the multi-kW level without significant AC conductor losses. In general, a system having coupled inductors has low core losses due to a reduced AC flux component in the core, and a smoother current and less loss in switches due to a reduced RMS current flowing in the switches.

The use of a material in the boost converter that is both magnetically and mechanically soft allows strict manufacturing tolerances to be achieved without a gap between materials and without the generation of thermal stresses or cracks. In some cases, the boost converter can be fabricated at room temperature, allowing the fabrication process to be readily integrated with existing manufacturing processes.

A boost converter having the ability to generate standby power without driving the large loads coupled to the main primary induction coils reduces switching losses and other power inefficiencies.

Other features and advantages of the invention are apparent from the following description and from the claims.

DETAILED DESCRIPTION

Figure 2:
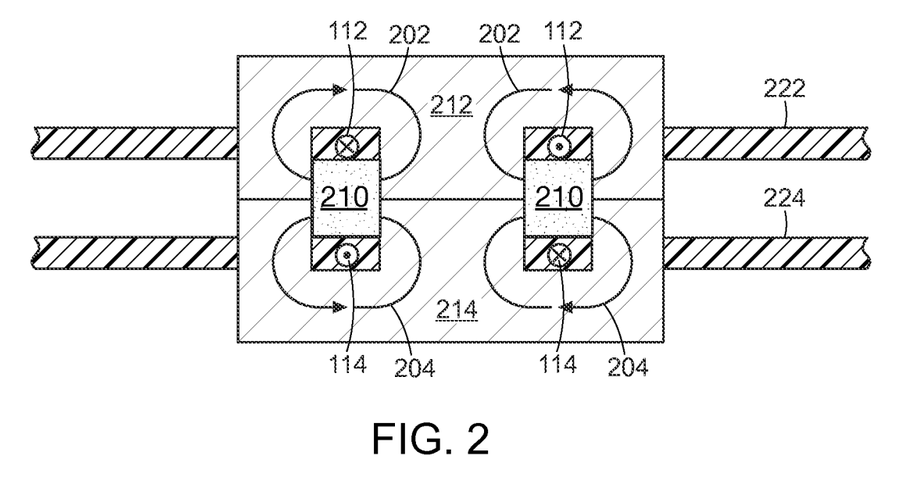
FIG. 2 is a side cross-sectional view of a boost converter having a magnetic core formed from two materials.
Figure 3A:
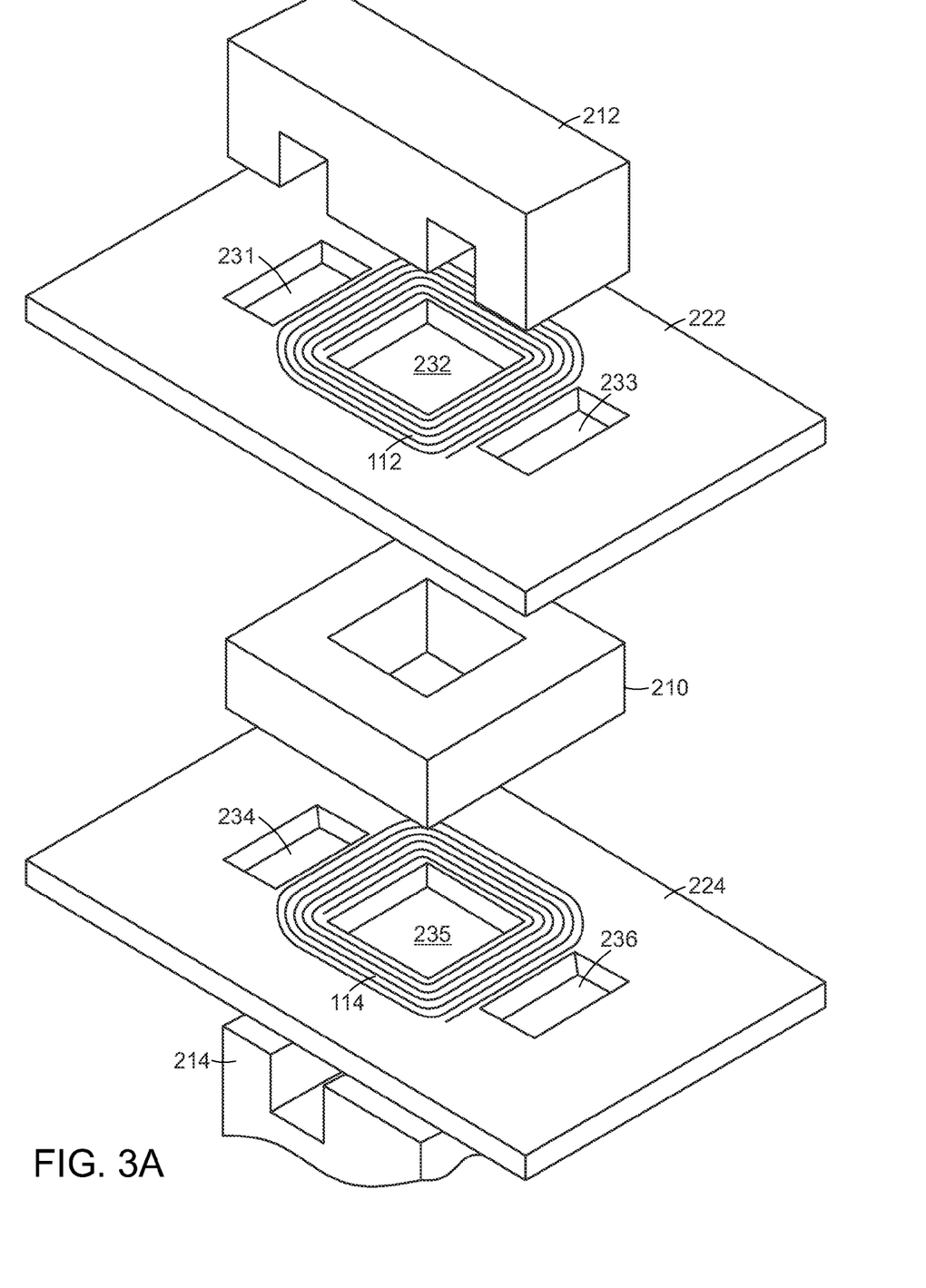
FIGS. 3A and 3B are perspective views of the boost converter of FIG. 2 as exploded and as assembled, respectively.
Figure 3B:
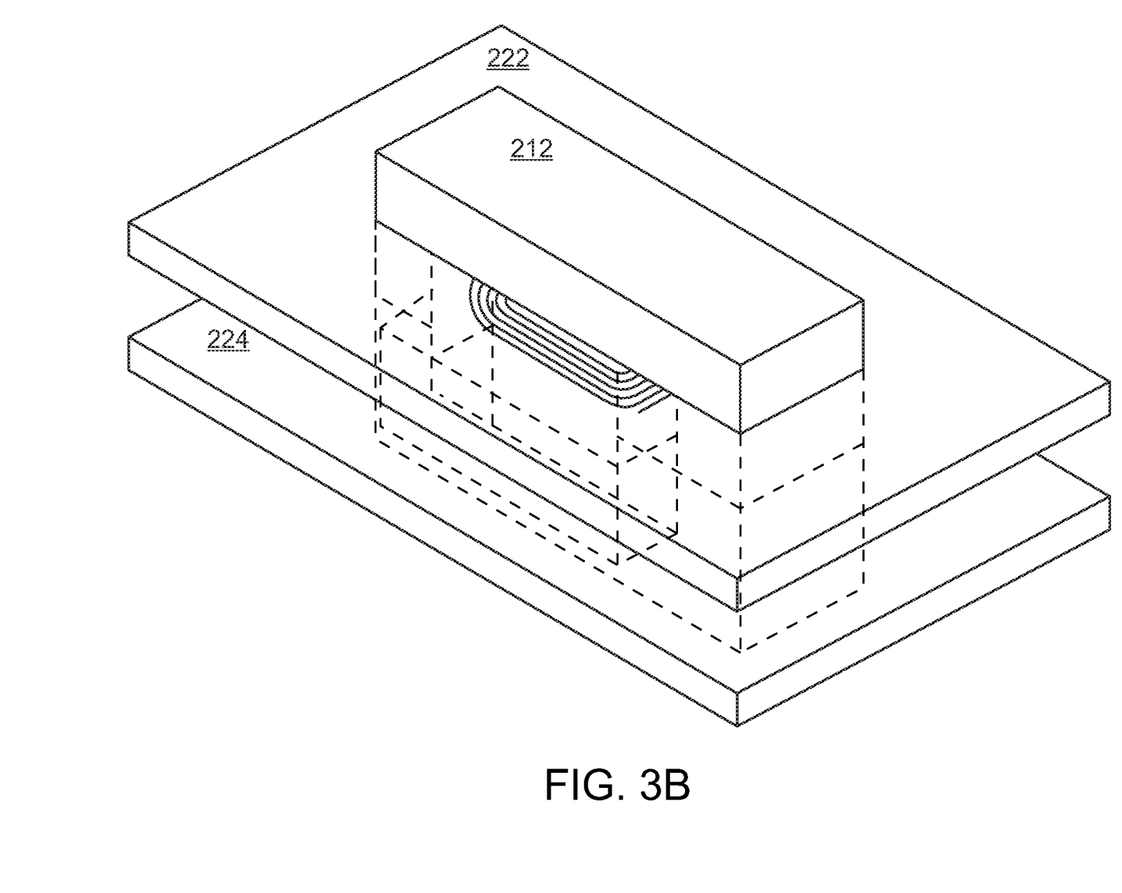

Referring to FIGS. 2 and 3A-B, in some embodiments, the dual interleaved boost circuit 100 shown in FIG. 1 is implemented using a magnetic core made up of multiple elements 210, 212, 214 that are assembled together surrounding the windings 112, 114 of the inductors. Winding 112 is formed on a printed circuit board 222 around a central opening 232 of the board. Winding 114 is similarly formed around a central opening 235 of a second printed circuit board 224. As shown in the exploded view of FIG. 3A, the magnetic core is formed in part by a first multi-legged element 212, the legs of which, when assembled as shown in FIG. 3B, pass through openings 231, 232, 233 in the first circuit board 222. The magnetic core is further formed by a second multi-legged element 214, the legs of which, when assembled, pass through openings 234, 235, 236 in the second circuit board 224 such that the legs of elements 212 and 214 mate between the two printed circuit boards. When assembled, each of the windings 112, 114 is effectively wound around the mated center legs of the first and second elements 212, 214. As shown in the cross-sectional view of FIG. 2, the mated first and second elements 212, 214 do not fill the area between the windings.

In general, elements 212 and 214 are made of a material with a high magnetic permeability (relative permeability $\mu$), such as ferrite, to enable magnetic coupling between the windings. In the area between the windings, a low-$\mu$ material allows for energy storage, which is proportional to $\mu^{-1}$. In some embodiments, the magnetic core is further formed from a third element 210 of a different material than the first two elements. Referring to FIG. 3A, in some embodiments, this third element 210 forms a ring or "donut" shape (e.g., a rectangular ring or a substantially circular ring) such that, when assembled, the third element fills the space between the windings where the air gap would have been.

In some cases, the material of the third element 210 has a significantly lower magnetic permeability $\mu$ (i.e., higher magnetic reluctivity) than the first 212 and second 214 elements. Referring again to the cross-sectional view of FIG. 2, the magnetic field lines 202, 204 induced by corresponding currents in the windings 112, 114 are largely coupled via the high-permeability elements 212, 214, while energy storage is primarily localized to the lower-permeability ring element 210.

In some embodiments, the first and the second core elements 212, 214 are formed of a mechanically hard, magnetically soft material, such as ferrite (which has an elastic modulus of about 100 GPa). These parts may be difficult to manufacture to high dimensional tolerance or to maintain at a precise dimension due to environmental factors (e.g., temperature). For example, the lateral distance between the legs of the elements may not be fabricated to a predictable precise dimension.

In some embodiments, the third ring element 210 of the core is formed from a mechanically soft material having an elastic modulus of about 1000 times less than the elastic modulus of the rigid material of the first and second core elements. For instance, in some embodiments, the modulus of the third ring element is limited to no more than about 100 MPa. An example of a suitable type of material is a soft, pliable composite combining a magnetic phase (e.g., iron powder, ferrite powder, Sendust, or another finely ground magnetically soft material capable of providing low hysteresis and eddy current losses) in a polymer matrix (e.g., a rubber, an epoxy, or a urethane). The third ring element has a magnetic permeability in the range of about 8-80, or preferably in the range of about 10-30. One example of such a material, made by Daido Steel Co., Ltd. (Tokyo, Japan), is a composite of a Metglas® alloy (Metglas, Inc., Conway, S.C.) in a rubber matrix that exhibits AC losses close to that of powdered iron ($\mu$=10) and has a permeability $\mu$=30 at zero field.

In general, the mechanically hard components (i.e., circuit boards 222, 224 and hard elements 212, 214 of the core) are assembled using standard manufacturing processes. In some embodiments, the components are assembled leaving a gap into which ring element 210 can later be inserted rather than the ring being inserted during initial assembly. In some embodiments, an uncured precursor to the material of ring element 210 is squeezed into the gap and cured at elevated temperature to form the ring element. In other embodiments, ring element 210 is formed outside of the boost converter and mechanically deformed as it is pushed into the gap or as the other elements of the boost converter are pushed around the ring element. In some examples, the ring element 210 is formed of a putty-like material. To be compatible with existing manufacturing protocols, room temperature fabrication and assembly of boost converter, including insertion of third element 210 of the core, is preferable.

In some examples, the third element 210 is formed from a material that cures during or after the manufacturing process. For example, the material may be soft during assembly and then hardened in a curing process. In general, even in its hardened state, the material of the third element remains mechanically softer (e.g., about 1000 times softer) than the material of the mechanically hard elements of the core) so that any strain resulting from unequal coefficients of thermal expansion is absorbed by the third element. In some examples, the material is resilient, thereby maintaining contact with the other elements of the core in the face of mechanical movement or thermal expansion of the elements. In some examples, a chamber is formed between the circuit boards, and the third element is formed by pouring or injecting a liquid into the chamber, which may then be cured to form a flexible or rigid third element. In some examples, the manufacturing process is performed at a high temperature at which the third element is soft (e.g., flexible, resilient), while in operation the device operates at a lower temperature at which the element is relatively harder (e.g., less flexible or resilient).

In other examples, the third ring element 210 of the core may be formed from a rigid material. However, if the first and second core elements are not precisely dimensioned or if the third element exhibits different thermal expansion characteristics than the first and second elements, a rigid third element may have to be under-sized sufficiently to allow assembly. Such under-sizing may result in an undesirable air gap. Furthermore, if the ring element 210 were formed of a rigid material having a substantially different coefficient of thermal expansion than that of the other elements, cracking or distortion may occur upon heating of the boost converter.

Referring to FIG. 3A, the windings of the boost converter are formed using printed circuit tracings on the printed circuit board (e.g., board 222). For instance, the windings can include spiral paths on one or more layers of the board with the paths surrounding openings in the board through which the magnetic core passes when assembled. Note that the vertical dimension of trace is very small as compared to its horizontal dimension, thereby forming a ribbon-like conductor. In certain modes of operation, such a low vertical dimension combined with the direction of magnetic field lines reduces eddy current losses as compared to other configurations. In part, the reduced losses are due to the orientation of the magnetic field in the windings: the magnetic field (H) vector is parallel to the wide axis of the windings. The reduced losses are also due to the magnetic permeability of the winding material: the magnetic (H) field is about ten times lower in a material with $\mu$=10 than in air, and eddy current losses scale as the magnetic field squared ($H^2$).

The boost converter of FIGS. 2 and 3A-B may provide for reduced AC conductor losses, such as eddy current losses, as compared to a boost converter having an air gap, for instance by roughly a factor of 5, under the same operating conditions.

This reduction in AC conductor loss may bring the AC conductor loss closer to the level of the DC loss (e.g., roughly twice the DC loss), which may be desirable in many applications.

In a power factor converter (PFC) such as the boost converters described above, the PFC windings provide a high level of power to a load. For instance, the PFC windings in boost converter 100 (FIG. 1) are coupled to a pair of large MOSFET switches 122, 124 (Q1 and Q2) which enable the PFC windings to throughput kilowatts of power.

When a PFC is delivering little or no power to the load, it may in some cases still be desirable to maintain a low level of power for standby operation. A set of secondary windings may be used to provide low power, enabling standby operation. However, driving the smaller secondary windings using the voltage across the larger primary windings (i.e., main primary windings 112, 114) may entail significant switching losses resulting from the drain-source capacitance of the large MOSFET switches 122, 124 (Q1 and Q2) coupled to the primary windings.

Figure 7:
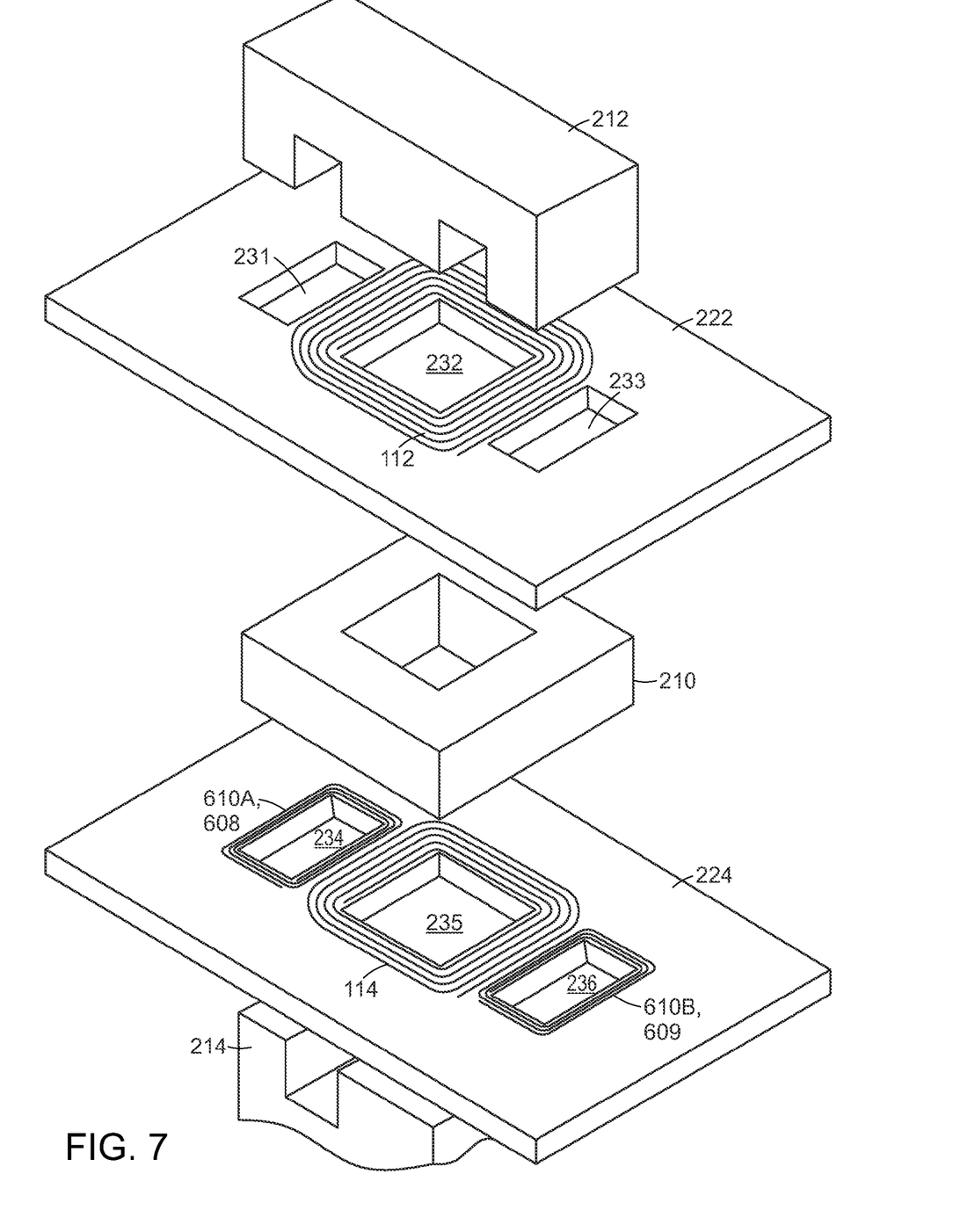
FIG. 7 is a perspective view of a boost converter configured for normal and standby operation.

Referring to FIG. 7, a PFC choke 600 includes three sets of windings: main primary windings L1 112 and L2 114, which function as described above; secondary windings L4 608 and L5 609; and primary low-power windings L3A 610A and L3B 610B. Secondary windings 608, 609 and primary low-power windings 610A, 610B are wound around outer legs 702, 704 of a core 700. Secondary windings 608, 609 provide efficient low-power output (e.g., housekeeping power) in both normal and standby operating mode, and can be excited either by currents in the main primary windings 112, 114 (e.g., during normal operating mode) or by currents in the primary low-power windings 610A, 610B (e.g., during standby operation). In some embodiments, main primary windings 112, 114 have a power capacity at least ten times greater than the power capacity of main low-power windings 610A, 610B, e.g., a power capacity of at least 0.2 kW.

Figure 5A:
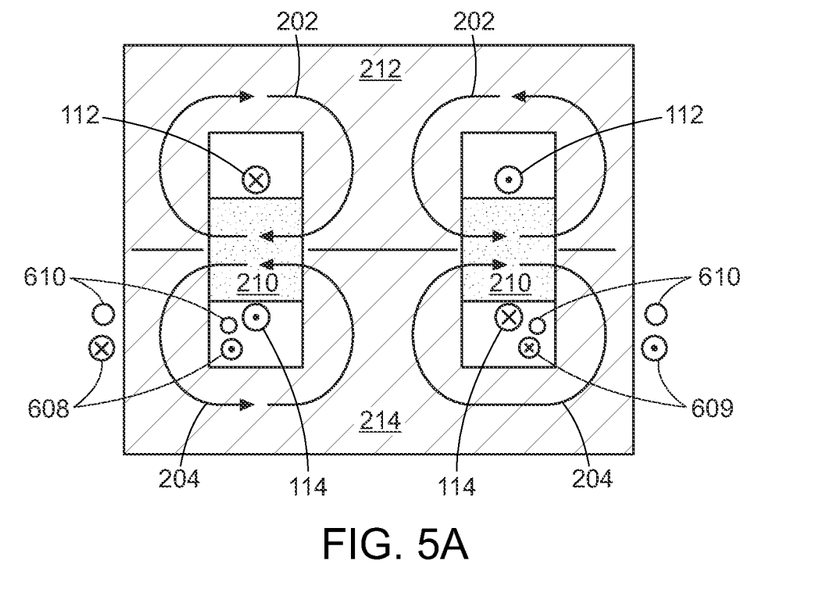
FIGS. 5A and 5B are side cross-sectional views of a boost converted with coils for low power driven by main power coils and driven by low power coils, respectively.
Figure 6A:
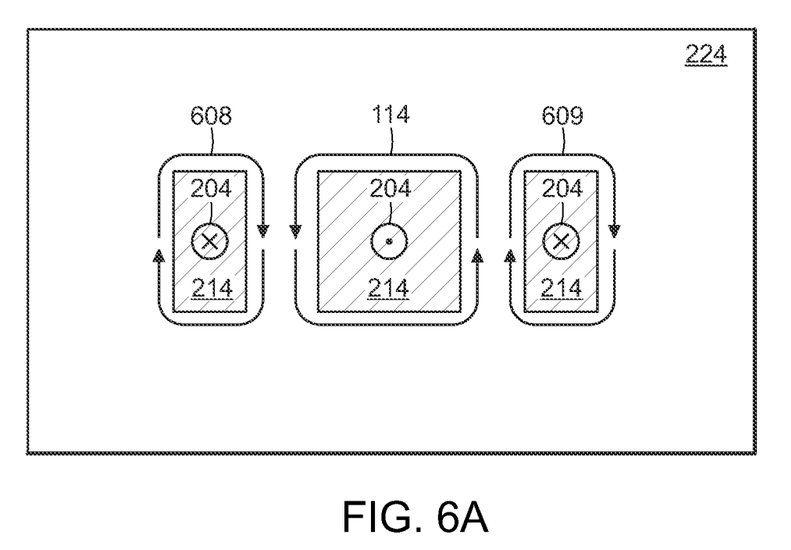
FIGS. 6A and 6B are top cross-sectional views of the boost converters shown in FIGS. 5A and 5B, respectively.

Referring to FIGS. 5A and 6A, magnetic flux lines 202, 204 are created by a current through main primary windings 112, 114 (the arrows in FIG. 6A indicate the direction of current flow in the windings). Flux lines 202, 204 are capable of exciting secondary windings 608, 609, e.g., during normal operating mode. Notably, flux lines 202, 204 induce an electromagnetic field in primary low-power winding 610A that is out of phase from the electromagnetic field induced in primary low-power winding 610B, such that the overall field cancels and no net voltage is induced across the primary low-power windings. That is, main primary windings 112, 114 are incapable of exciting a current in primary low-power windings 610A, 610B.

Figure 5B:
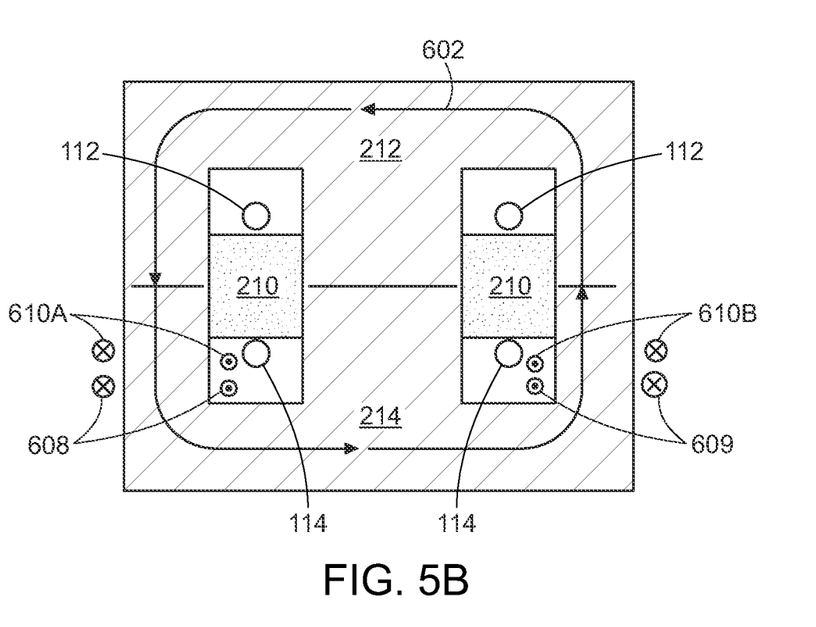
Figure 6B:
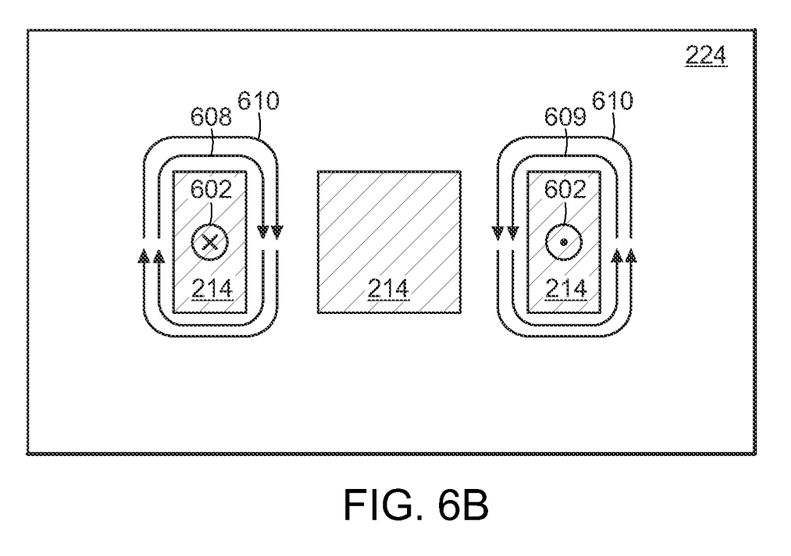

Referring now to FIGS. 5B and 6B, a magnetic flux path 602 is created by a current through primary low-power windings 610A, 610B. Flux path 602 is capable of exciting secondary windings 608, 609, e.g., during standby operation. Notably, none of the flux associated with primary low-power windings 610A, 610B links main primary windings 112, 114. That is, primary low-power windings 610A, 610B are incapable of exciting a current in main primary windings 112, 114.

Main primary windings 112, 114 and primary low-power windings 610A, 610B are thus magnetically orthogonal to each other. That is, there is no magnetic coupling between these two sets of windings, and each set of windings can be operated independently without inducing currents in the other set of windings.

Figure 4:
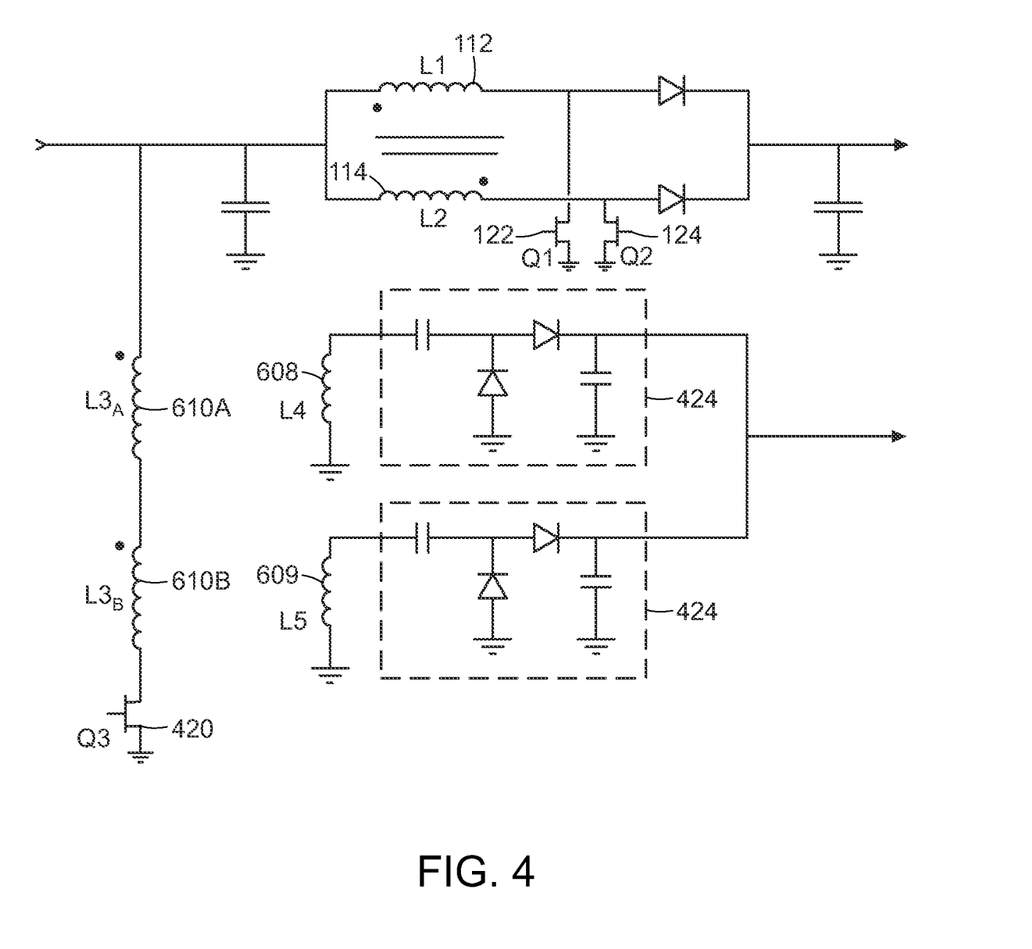
FIG. 4 is a circuit diagram of a boost circuit with low-power windings.

Referring FIG. 4, in the circuit of PFC choke 600, secondary windings L4 608 and L5 609 are coupled through rectifier circuits 424 (e.g., a voltage double rectifier) to provide a low voltage output. Generally, in a normal operating mode, these low power windings are coupled to and receive power from the main primary inductor windings L1 112 and L2 114, as described above. In standby mode, the main windings are not energized and the secondary windings L4 608 and L5 609 receive power from primary low-power windings L3A 610A and L3B 610B, which are connected in series and coupled to a MOSFET switch 420 (Q3). That is, while the secondary windings 608, 609 are rectified separately from the main primary windings 112, 114 and from the primary low-power windings 610A, 610B, the secondary windings can be excited either by currents in the main primary windings 112, 114 or by currents in the primary low-power windings 610A, 610B, depending on the operating mode.

Because Q3 (the switch coupled to primary low-power windings 610A, 610B) is significantly smaller than Q1 and Q2 (of the switches 122, 124 coupled to the main primary windings), driving the secondary windings with the primary low-power windings during standby mode avoids the inefficiencies inherent in unnecessarily driving the large loads (Q1 and Q2) coupled to the main primary windings.

The use of a soft magnetic material, such as a magnetic composite, and the orthogonality of primary and secondary magnetic windings are not limited to use in PFC converter systems, but may used generally in, e.g., any power converter system or transformer having coupled inductor windings.

It is to be understood that the foregoing description is intended to illustrate and not to limit the scope of the invention, which is defined by the scope of the appended claims. Other embodiments are within the scope of the following claims.

What is claimed is:

1. A power conversion device comprising:
    a magnetic core having first, second, and third legs, the first leg being between the second and third legs; and
    a plurality of windings surrounding portions of the magnetic core, including a first set of windings around the first leg and defining a first magnetic flux path, a second set of windings around the second and third legs and defining a second magnetic flux path, and a third set of windings around the second and third legs;
    wherein magnetic flux in both the first magnetic flux path and the second magnetic flux path induces a current in each winding of the third set of windings, and
    the first set of windings are magnetically orthogonal to the second set of windings, such that magnetic flux in the first magnetic flux path does not induce current in the second set of windings and magnetic flux in the second magnetic flux path does not induce current in the first set of windings.

2. The power conversion device of claim 1 operable in a plurality of modes, including a first mode in which power is transferred from one or more windings of the first set of windings to the windings of the third set of windings, and in a second mode in which power is transferred from windings of the second set of windings to the windings of the third set of windings.

3. The power conversion device of claim 2 further comprising circuitry to form a first power supply using the first set of windings operable only in the first mode, and circuitry to form a second power supply for providing power via the third set of windings operable in both the first mode and the second mode.

4. The power conversion device of claim 3 wherein the first mode comprises a primary operating mode and the second mode comprises a standby operating mode.

5. The power conversion device of claim 3 wherein the first power supply has a power capacity at least ten times greater than the second power supply.

6. The power conversion device of claim 3 wherein the first power supply has a power capacity of at least 0.2 kW.

7. The power conversion device of claim 3 wherein the first power supply comprises a boost converter.

8. The power conversion device of claim 7 wherein the first set of windings comprises a plurality of windings coupled by the magnetic core, and wherein the boost converter comprises an interleaved boost converter.

9. The power conversion device of claim 3, wherein the circuitry further comprises a rectifier coupled to each of the windings of the third set of windings.

10. The power conversion device of claim 3, wherein the circuitry further comprises a charge pump coupled to each of the windings of the third set of windings.

11. The power conversion device of claim 1 wherein the second set of windings comprises a plurality of windings arranged in a serial connection, and the third set of windings comprises a plurality of windings, each winding of the third set of windings correspond to a different one of the windings of the second set of windings.

12. The power conversion device of claim 1, wherein each of the windings of the first set of magnetic windings is coupled to a MOSFET having a first current rating, and wherein each winding of the second set of windings is coupled to a MOSFET having a second current rating less than the first current rating.

13. The power conversion device of claim 1, wherein each winding of the first set of windings is disposed on a substrate of a set of one or more substrates, the first leg of the magnetic core passing through openings in the substrates on which the first set of windings is disposed.

14. A method for power conversion comprising:
in a first operating mode,
providing current through windings of a first set of windings surrounding a first leg of a magnetic core, forming a first magnetic flux path,
wherein the first magnetic flux path couples power from the first set of windings to a third set of windings surrounding second and third legs of the magnetic core and magnetically coupled to the first set of windings via the magnetic core, causing a first power output from the third set of windings; and
in a second operating mode,
providing current through windings of a second set of windings surrounding the second and third legs of the magnetic core, forming a second magnetic flux path, the second set of windings being magnetically orthogonal to the first set of windings,
wherein the second magnetic flux path couples power from the second set of windings to the third set of windings magnetically coupled to the second set of windings via the magnetic core, causing a second power output from the third set of windings.

15. The method of claim 14, wherein the first operating mode comprises a primary operating mode and the second operating mode comprises a standby operating mode.

16. The method of claim 14, wherein the first set of windings form part of a first power supply and the second set of windings form part of a second power supply.

17. The method of claim 16, wherein the first power supply has a power capacity at least ten times greater than the second power supply.

* * * * *